Patented Nov. 4, 1952

2,616,873

UNITED STATES PATENT OFFICE 2,616,873

ORGANO-PHOSPHORUS RESINOUS COMPOSITIONS

William E. Cass, Schenectady, N. Y., assignor to General Electric Company, a corporation of New York No Drawing. Application March 23, 1948, Serial No. 16,619

9 Claims. (Cl. 260—61)

This invention is concerned with phosphorus-containing resinous compositions and methods for preparing the same. More particularly, the invention relates to a resinous composition of matter comprising the product of reaction between (1) an organo-phosphorus compound corresponding to the formula

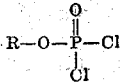

where R is an aryl radical, and (2) a dihydroxy aromatic compound in which the hydroxyl groups are non-adjacent, i. e., attached directly to an aromatic nucleus and are separated by at least three carbon atoms.

It has been known heretofore that phosphorus halides may be reacted with dihydroxy aromatic compounds. In one instance, inorganic phosphorus halides in considerable molar excess (e. g., phosphorus trichloride or phosphorus oxychloride) have been reacted with either a para-dihydroxy (hydroquinone), or an ortho-dihydroxy (cathechol) or a meta-dihydroxy aromatic compound (resorcinol) to yield pure chemical compounds which are non-resinous and easily hydrolyzed [see Knauer, Berichte 27, 2565 (1894)]. In the case of the ortho-dihydroxy aromatic compound, 5-membered rings were formed. In addition, organo-phosphorus halides (e. g., phenyl phosphoryl chloride,

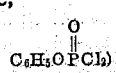

have been reacted with ortho-dihydroxy benzene (cathechol) to yield pure chemical compounds having no resinous properties and containing the aforementioned 5-membered ring [Anschutz and Walbrecht, J. Prakt. Chem. 133, 65 (1932)].

I have now discovered that I am able to obtain resinous compositions of matter having useful properties by effecting reaction between (1) an organo-phosphorus compound corresponding to the formula

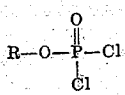

where R is an aryl hydrocarbon radical, for example, phenyl, naphthyl, biphenyl, tolyl, xylyl, ethylphenyl, alpha-methylnaphthyl, etc., radicals, and (2) a dihydroxy aromatic compound free of reactive substituents in which the hydroxyl groups are separated by at least three carbon atoms, the said dihydroxy aromatic compound corresponding to the general formula

HO(Z)OH where Z is a divalent aromatic hydrocarbon radical, e. g., phenylene, naphthylene, biphenylene, etc., radicals and the hydroxyl groups are attached directly to an aromatic nucleus and are separated by at least three carbon atoms. The fusible linear polymers may be considered as having the repeating structural unit

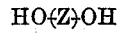

where R and Z have the meanings given above.

The manner in which the claimed resinous compositions may be prepared may be varied within wide ranges. One method comprises heating the mixture of the organo-phosphorus compound and the dihydroxy aromatic compound, preferably under an inert atmosphere, e. g., nitrogen, etc., at a temperature ranging from about 50° to 300° C., preferably from 100° to 250° C. The heating is conducted for a length of time sufficient to complete the reaction between the coreactants until there is no further evidence of the evolution of gaseous hydrogen halide. I have found it advantageous to heat the mixture, after the preliminary heating, under vacuum for a time at a temperature of from 150° to 250° C. to assure complete reaction between ingredients. Such vacuum heating is usually conducted until there is no evidence of bubbling of the reaction mixture.

The proportion of organo-phosphorus compound and the dihydroxy aromatic compound may be varied depending upon many factors. Although I prefer to employ equivalent or equimolar proportions of these two reactants, I have found that a slight excess of the dihydroxy aromatic compound insures more satisfactory results. Thus, I may employ from 1.0 to 1.1 mols of the dihydroxy aromatic compound per mol of the organo-phosphorus compound.

In order that those skilled in the art may better understand how the present invention may be practiced, the following examples are given by way of illustration and not by way of limitation.

*Example 1*

Phenyl phosphoryl chloride (211 grams, 1 mol)

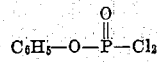

and 115 grams (1.05 mols) hydroquinone were placed in a flask fitted with a mechanical stirrer, gas inlet tube, thermometer and a reflux condenser which was protected by a calcium chloride tube. While a slow stream of dry nitrogen was passed through the mixture, the flask was heated in an oil bath for 14 hours at 168–197° C. while stirring the mixture continuously. Gaseous hydrogen chloride was evolved. At the end of this heating period a vacuum of 2.5–5.0 mm. was applied to the system and the flask heated in the oil bath at 169–184° C. until bubbling of the mixture practically ceased. There resulted from this reaction a clear, light brown resin which was plastic and non-tacky at room temperature. This resin was believed to be a linear polymer corresponding to the following formulation:

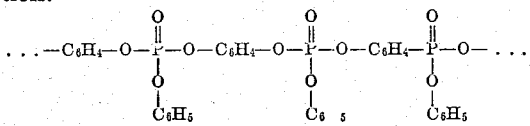

When a sample of the above resin was heated on a 300° C. hot plate for from 8 to 10 minutes, it was unexpectedly converted to a solid, flexible, rubbery material which could be stripped from the hot plate and at room temperature still showed good flexibility. The film was flameproof and did not support combustion. When the molten resin was applied to a glass cloth tape and the tape placed in a 300° C. oven for 3 to 5 minutes, the resin again was transformed into a solid, flexible material which showed considerable flexibility at room temperature.

*Example 2*

In this example, 105.5 grams (0.5 mol) phenyl phosphoryl chloride and 55 grams (0.5 mol) resorcinol were placed in a flask fitted with a thermometer, stirrer and reflux condenser. The mixture was heated with constant stirring for 3 hours to a maximum temperature of 290° C. When cooled to room temperature, the resulting resin was flexible and tacky and dark brown in color. Spread in a thin film on a 300° C. hot plate, the resin reached a gelled state in one-half minute. When a small amount of paraformaldehyde was added to the uncured resin, the resulting mixture slowly gelled when heated to 100–150° C. showing the cure accelerating effect of the paraformaldehyde.

*Example 3*

Phenyl phosphoryl chloride (25 grams, 0.306 mol) and 57 grams (0.306 mol) 4,4′-dihydroxybiphenyl were heated in an apparatus similar to that described in Example 1 for 2½ hours at 165–245° C. The resulting resin was flame-resistant, brown in color and hard and brittle at room temperature, but still heat-fusible. It was slowly transformed into a gelled flexible resin on a 300° C. hot plate.

Although organophosphorus halides such as phenyl phosphorus oxydichloride

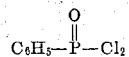

when reacted with hydroquinone in a manner similar to that employed in the foregoing examples, yielded resinous products, unexpectedly it was found that such resins acted differently from the resinous compositions embraced by my invention. Thus, whereas my claimed resinous products, although initially soluble and fusible, could be gelled and rendered substantially insoluble and infusible when heated at around 300° C., a resin made from, for example, phenyl phosphorus oxydichloride and hydroquinone were permanently soluble and fusible even when heated at 300° to 360° C. for relatively long periods of time. This result was unexpected and in no way could have been predicted since the materials employed in preparing my claimed compositions contained difunctional groupings which would be expected to give linear, permanently fusible polymers.

It will be apparent to those skilled in the art that other organo-phosphorus compounds corresponding to the general formula disclosed previously, as well as other dihydroxy aromatic compounds, may be employed in addition to the ones disclosed in the foregoing examples. Among the additional organo-phosphorus compounds which may be used in the practice of this invention may be mentioned, for example, tolyl phosphoryl chloride, naphthyl phosphoryl chloride, α-methylnaphthyl phosphoryl chloride, biphenyl phosphoryl chloride, etc. Among the dihydroxy aromatic compounds which also may be employed may be mentioned 1,3-dihydroxy naphthalene, 1,4-dihydroxy naphthalene 1,5-dihydroxy naphthalene, 1,3′-dihydroxy naphthalene, 2,4-dihydroxy diphenyl, 2,4′-dihydroxy biphenyl, etc.

The claimed compositions of matter may be employed as plasticizers for other resinous coating compositions. They may also be used as coating and impregnating agents for various insulating materials where good flame and heat-resistance are desired.

What I claim as new and desire to secure by Letters Patent of the United States is:

1. A resinous composition of matter comprising the product of reaction under heat between (1) an organo-phosphorus compound corresponding to the formula

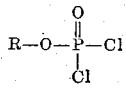

where R is an aryl hydrocarbon radical, and (2) a dihydroxy aromatic compound free of reactive substituents in which the hydroxyl groups are attached directly to the aromatic nucleus and are separated by at least 3 carbon atoms, the dihydroxy aromatic compound being present in the molar ratio equal to from 1.0 to 1.1 mols per mol of the organo-phosphorus compound.

2. A resinous composition of matter comprising the product of reaction under heat between (1) an organo-phosphorus compound corresponding to the formula

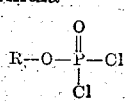

where R is an aryl hydrocarbon radical, and (2) a dihydroxy benzene free of reactive substituents in which the hydroxyl groups attached directly to the benzene nucleus and are separated by at least 3 carbon atoms, the dihydroxy benzene compound being present in a molar ratio equal to from 1.0 to 1.1 mols thereof per mol of the organo-phosphorus compound.

3. A composition of matter comprising the product of reaction under heat between (1) phenyl phosphoryl chloride and (2) a dihydroxy aromatic compound in which the hydroxyl groups are connected directly to the aromatic nucleus and are separated by at least 3 carbon atoms, the dihydroxy aromatic compound being present in a molar ratio equal to from 1.0 to 1.1 mols thereof per mol of the phenyl phosphoryl chloride.

4. A resinous composition of matter comprising the product of reaction under heat between (1) phenyl phosphoryl chloride and (2) hydroquinone, the hydroquinone being present in a molar ratio equal to from 1.0 to 1.1 mols thereof per mol of the phenyl phosphoryl chloride.

5. A resinous composition comprising the product of reaction under heat between (1) phenyl phosphoryl chloride and (2) resorcinol, the resorcinol being present in a molar ratio equal to from 1.0 to 1.1 mols thereof per mol of the phenyl phosphoryl chloride.

6. A resinous composition of matter comprising the product of reaction under heat between (1) phenyl phosphoryl chloride and (2) 4,4'-dihydroxybiphenyl, the latter compound being present in a molar ratio equal to from 1.0 to 1.1 mols thereof per mol of the phenyl phosphoryl chloride.

7. The process of making a resinous composition of matter which comprises (1) mixing an organo-phosphorus compound corresponding to the formula

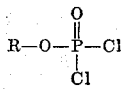

where R is an aryl hydrocarbon radical with a dihydroxy aromatic compound free of reactive substituents in which the hydroxyl groups are attached directly to the aromatic nucleus and are separated by at least 3 carbon atoms, the dihydroxy aromatic compound being present in a molar ratio equal to from 1.0 to 1.1 mols thereof per mol of the organophosphorus compound, and (2) heating the said mixture at a temperature of from 50° to 300° C. to yield a resinous composition of matter.

8. A resinous composition comprising the product of reaction under heat between substantially equimolecular proportions of (1) biphenyl phosphoryl chloride and (2) a dihydroxy aromatic compound free of reactive substituents in which the hydroxyl groups are attached directly to the aromatic nucleus and are attached to non-adjacent carbon atoms.

9. A resinous composition of matter comprising the product of reaction under heat between substantially equimolecular proportions of (1) an organo-phosphorus compound corresponding to the formula

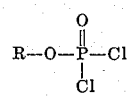

where R is a monovalent aromatic hydrocarbon radical and (2) a dihydroxy aromatic compound free of reactive substituents in which the hydroxyl groups are attached directly to the aromatic nucleus and are attached to non-adjacent carbon atoms.

WILLIAM E. CASS.

REFERENCES CITED

The following references are of record in the file of this patent:

UNITED STATES PATENTS

| Number | Name | Date |
| --- | --- | --- |
| 2,272,668 | Honel | Feb. 10, 1942 |
| 2,435,252 | Toy | Feb. 3, 1948 |